(12) United States Patent
Itten et al.

(10) Patent No.: US 12,062,934 B2
(45) Date of Patent: Aug. 13, 2024

(54) SYSTEM FOR DISTRIBUTING ELECTRICAL ENERGY

(71) Applicant: Bucher Hydraulics AG, Neuheim (CH)

(72) Inventors: Alex Itten, Romanshorn (CH); Bernhard Laeng, Romanshorn (CH); Matthias Thurn, Bischbrunn (DE); Peter Bode, Arnegg (CH)

(73) Assignee: Bucher Hydraulics AG, Neuheim (CH)

( * ) Notice: Subject to any disclaimer, the term of this patent is extended or adjusted under 35 U.S.C. 154(b) by 92 days.

(21) Appl. No.: 17/914,420

(22) PCT Filed: Mar. 26, 2021

(86) PCT No.: PCT/EP2021/057990
§ 371 (c)(1),
(2) Date: Sep. 26, 2022

(87) PCT Pub. No.: WO2021/191437
PCT Pub. Date: Sep. 30, 2021

(65) Prior Publication Data
US 2023/0104950 A1  Apr. 6, 2023

(30) Foreign Application Priority Data
Mar. 27, 2020  (DE) ...................... 10 2020 204 036.2

(51) Int. Cl.
*H02J 7/00* (2006.01)
(52) U.S. Cl.
CPC ........ *H02J 7/0031* (2013.01); *H02J 7/00045* (2020.01); *H02J 7/0036* (2013.01); *H02J 7/0047* (2013.01)
(58) Field of Classification Search
CPC .................................................. H02J 7/0031
(Continued)

(56) References Cited

U.S. PATENT DOCUMENTS

| 6,466,028 B1 | 10/2002 | Coppinger et al. |
| 2013/0334820 A1 | 12/2013 | Goetz et al. |

(Continued)

FOREIGN PATENT DOCUMENTS

| DE | 10 2012 210 078 A1 | 12/2013 |
| DE | 10 2016 214 050 A1 | 2/2018 |

(Continued)

OTHER PUBLICATIONS

International Search Report (PCT/ISA/210) issued in PCT Application No. PCT/EP2021/057990 dated Jun. 30, 2021 with English translation (five (5) pages).

(Continued)

*Primary Examiner* — Joseph Chang
(74) *Attorney, Agent, or Firm* — Crowell & Moring LLP

(57) ABSTRACT

A system includes a first, particularly mobile, unit which has a number m of function terminals, a first potential equalization terminal, which is intended to be galvanically connected to a reference potential, an energy source, a power converter, which is fed from the energy source and produces a number m of signals, a switching unit, the signals produced by the power converter being fed to the input side of the switching unit, and the output side of the switching unit being connected to the function terminals, or the input side of the switching unit being connected to the energy source and the output side of the switching unit being connected to the power converter, an insulation monitoring unit, which detects an undesired galvanic connection of a component of the system to the reference potential, and a connection monitoring unit, which monitors whether the first potential equalization terminal is properly electrically connected to a corresponding potential equalization terminal of a second unit to be connected to the first unit.

13 Claims, 3 Drawing Sheets

(58) Field of Classification Search
USPC .......................................................... 307/39
See application file for complete search history.

(56) References Cited

U.S. PATENT DOCUMENTS

2019/0308521 A1    10/2019  Enthaler et al.
2020/0110125 A1*   4/2020   Lehnhardt .......... G01R 31/1245

FOREIGN PATENT DOCUMENTS

| EP | 1 967 393 A1 | 9/2008 |
| GB | 2 399 467 A | 9/2004 |
| WO | WO 2012/010489 A1 | 1/2012 |

OTHER PUBLICATIONS

German-language Written Opinion (PCT/ISA/237) issued in PCT Application No. PCT/EP2021/057990 dated Jun. 30, 2021 (three (3) pages).

\* cited by examiner

SYSTEM FOR DISTRIBUTING ELECTRICAL ENERGY

BACKGROUND AND SUMMARY

The invention relates to a system for distributing electrical energy.

The invention is based on the object of making available a system for distributing electrical energy that enables ground fault detection in different units to be as simple as possible.

The system comprises at least a first unit. The first unit may be, for example, a mobile or drivable unit, for example a truck tractor unit.

The first unit comprises a number m of functional terminals to which corresponding functional terminals of further units of the system or electrical consumers are able to be connected as intended. The number m may be between 2 and 32, for example.

The first unit further comprises a first potential equalization terminal that is to be or is electrically connected as intended to a reference potential, in particular ground potential.

The first unit further comprises an energy source, for example in the form of a DC voltage source, in particular in the form of an electrical energy store or a battery.

The first unit further comprises a power converter that is fed from the energy source and that is designed to generate a number m of signals. The power converter may be, for example, a DC-AC converter, a DC-DC converter or a combination thereof, supplied from the energy source in the form of the DC voltage source or battery.

The first unit further comprises a controllable switching unit, the input side of which is supplied with the signals generated by the power converter and the output side of which is connected to the functional terminals. The switching unit can, for example, establish or interrupt an electrical connection between terminals on the input side and terminals on the output side. As an alternative, the input side of the switching unit can be connected to the energy source and the output side can be connected to the power converter.

The first unit further comprises an insulation monitoring unit that is designed to detect an undesired galvanic connection of a component of the system to the reference potential. Reference is made to the relevant specialist literature for the basic design and the basic mode of operation of such insulation monitoring units.

The first unit further comprises a connection monitoring unit that is designed to monitor whether the first potential equalization terminal is electrically connected as intended, for example is electrically connected in a sufficiently low-impedance manner, to a corresponding potential equalization terminal of a second unit to be connected to the first unit.

According to one embodiment, the first unit further comprises a first test signal terminal, wherein the connection monitoring unit is designed to supply a first test signal, for example a first test voltage or a first test current, to the first test signal terminal and, depending on a current or voltage signal present at the first potential equalization terminal, to monitor whether the first potential equalization terminal is electrically connected as intended to the corresponding potential equalization terminal of the second unit to be connected to the first unit.

According to one embodiment, the system comprises the second, in particular mobile, unit, that is coupled to the first unit for electrical energy exchange. The second mobile unit may be part of a trailer, for example. According to the invention, the first and the second unit are galvanically coupled to one another.

The second unit comprises its potential equalization terminal that is connected to the corresponding first potential equalization terminal of the first unit and its test signal terminal that is connected to the corresponding first test signal terminal of the first unit. The potential equalization terminal of the second unit is electrically connected to the test signal terminal of the second unit, for example short-circuited inside the second unit.

According to one embodiment, the second unit further comprises a number m of functional connections that are galvanically connected to the number m of functional terminals of the first unit.

According to one embodiment, the switching unit interrupts a connection between the power converter and the signal terminals when the connection monitoring unit detects that the first potential equalization terminal of the first unit is not electrically connected as intended to the corresponding potential equalization terminal of the second unit. As an alternative, the switching unit interrupts a connection between the energy source and the power converter when the connection monitoring unit detects that the first potential equalization terminal of the first unit is not electrically connected as intended to the corresponding potential equalization terminal of the second unit.

According to one embodiment, the system further comprises a third, in particular stationary, unit, that is coupled to the first unit or the second unit for energy exchange. The third unit comprise at least one potential equalization terminal that is connected to a further potential equalization terminal of the first unit or that is connected to a further potential equalization terminal of the second unit. The third unit can comprise two potential equalization terminals, with a first potential equalization terminal of the two potential equalization terminals being connected to a further potential equalization terminal of the first unit and a second potential equalization terminal of the two potential equalization terminals being connected to a further potential equalization terminal of the second unit. The connection monitoring unit is designed to monitor whether the at least one potential equalization terminal of the third unit is electrically connected as intended to a corresponding potential equalization terminal of the first unit or the second unit. According to the invention, the first and the third unit are galvanically coupled to one another.

According to one embodiment, the connection monitoring unit is designed to supply a second test signal to a second test signal terminal of the first unit and, depending on a signal present at a corresponding potential equalization terminal of the first unit and/or a signal present at a corresponding potential equalization terminal of the second unit, to monitor whether the at least one potential equalization terminal of the third unit is electrically connected as intended to a corresponding potential equalization terminal of the first unit or to a corresponding potential equalization terminal of the second unit.

According to one embodiment, the insulation monitoring unit is designed to detect an undesired galvanic connection of a component of the first unit and/or the second unit and/or the third unit to the reference potential.

According to one embodiment, the system has a plurality of first units, wherein a respective first unit generates the first test signal and/or the second test signal with a unique identifier. In other words, the two test signals can contain different identifiers that contain a unique identifier for each first unit placed on the market, which means that when the test signals are evaluated, it can be ensured that malfunctions of the connection monitoring unit caused by external signals from similar systems or by external interference are ruled out.

According to one embodiment, the switching unit interrupts a connection between the power converter and the signal terminals as soon as the insulation monitoring unit detects an undesired galvanic connection of a component of the first unit and/or the second unit and/or the third unit to the reference potential.

According to one embodiment, an electrical connection between the potential equalization terminals of the third unit and corresponding terminals of the first unit and/or the second unit is effected via a flexible, movable or sliding connection and/or via a temporarily fixed connection, in particular a grounding rod, screw connections or plug-in contacts.

According to one embodiment, the first test signal terminal is protected up to the first transfer point of the second unit against an undesired connection to the reference potential by double or reinforced insulation and/or the second test signal terminal is protected up to the second transfer point of the third unit against an undesired connection to the reference potential by double or reinforced insulation.

According to one embodiment, the switching unit interrupts the connection between the power converter and the signal terminals depending on the state of the first unit immediately or after a time delay after the connection monitoring unit detects that the first potential equalization terminal of the first unit is not electrically connected as intended to the corresponding potential equalization terminal of the second unit. As an alternative, the switching unit can interrupt a connection between the energy source and the power converter when the insulation monitoring unit detects an undesired galvanic connection of a component of the first unit and/or the second unit and/or the third unit to the reference potential.

According to one embodiment, the insulation monitoring unit determines the location of an undesired galvanic connection of a component to the reference potential of the first unit, the second unit or the third unit depending on the switching state of the switching unit.

The invention is described in detail below with reference to the drawings.

DETAILED DESCRIPTION OF THE DRAWINGS

Figure 1:
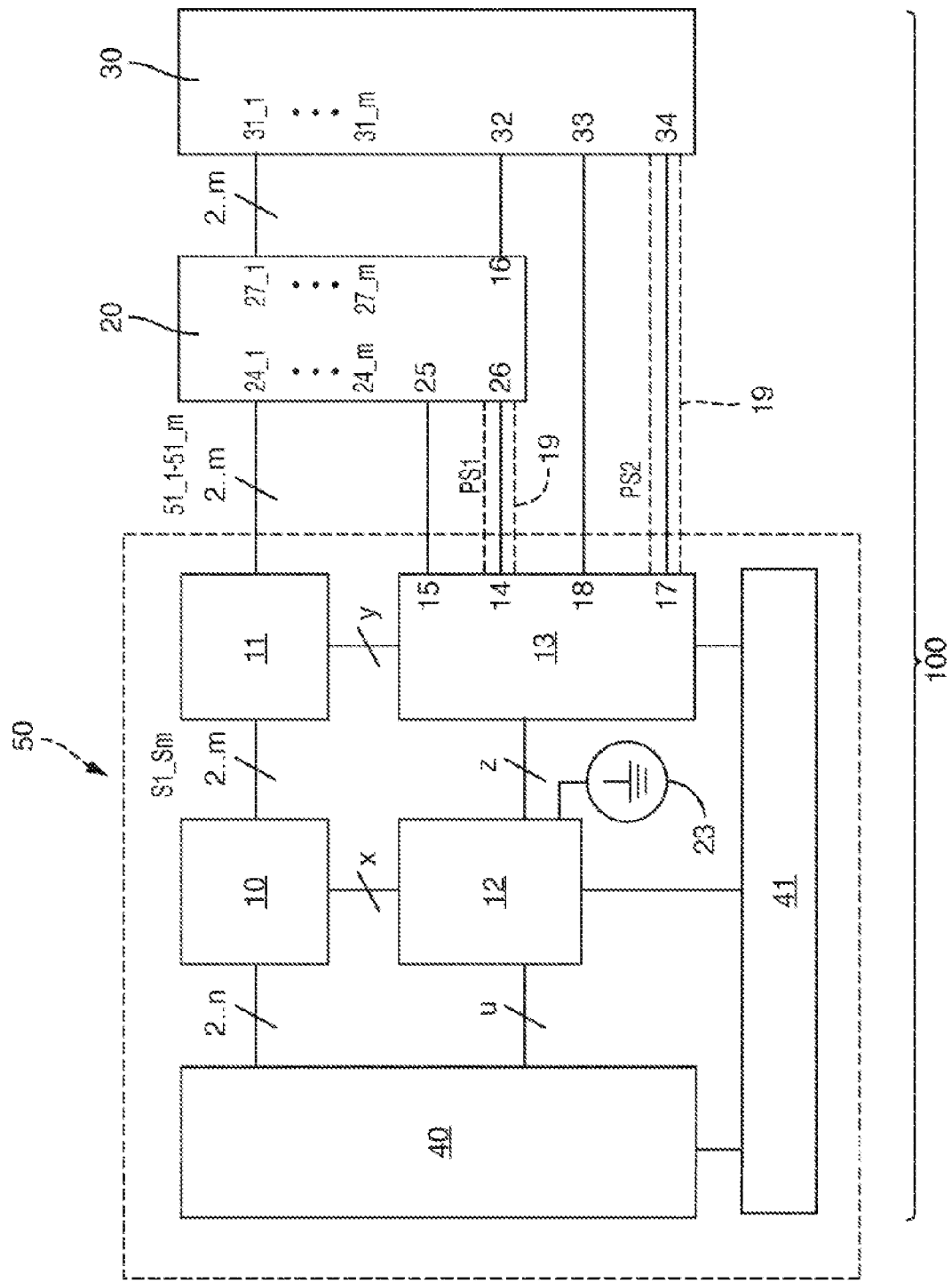
FIG. 1 is a schematic block circuit diagram of a system for distributing electrical energy.

FIG. 1 schematically shows a schematic block circuit diagram of a system 100 for distributing electrical energy.

The system 100 comprises a first, mobile unit 50 that can be arranged, for example, in a tractor unit of a truck. The first unit 50 comprises a number m of functional terminals 51_1 to 51_m at which, for example, DC and/or AC voltages can be output/input.

The system 100 further comprises a second, mobile unit 20 that can be arranged, for example, in a trailer towed by the tractor unit.

The system 100 further comprises a third, stationary unit 30.

The first unit 50 comprises a first potential equalization terminal 15 that is to be galvanically connected to a reference potential 23, for example ground potential, when the system 100 or the first unit 50 is in operation. The first unit 50 comprises a second potential equalization terminal 18 that is to be galvanically connected to the reference potential 23 when the system 100 or the first unit 50 is in operation.

The first potential equalization terminal 15 of the first unit 50 is connected to a corresponding potential equalization terminal 25 of the second unit 20. The second potential equalization terminal 18 of the first unit 50 is connected to a corresponding potential equalization terminal 33 of the third unit 30.

The first unit 50 further comprises a first test signal connection 14 that is connected to a corresponding test signal terminal 26 of the second unit 20. The first unit 50 further comprises a second test signal terminal 17 that is connected to a corresponding test signal terminal 34 of the third unit 30.

The second unit 20 further comprises a second test signal terminal 16 that is connected to a corresponding test signal terminal 32 of the third unit 30.

The functional terminals 51_1 to 51_m of the first unit 50 are galvanically connected to corresponding functional terminals 24_1 to 24_m of the second unit 20. Functional terminals 27_1 to 27_m of the second unit 20 are galvanically connected to corresponding functional terminals 31_1 to 31_m of the third unit 30.

The first unit 50 further comprises an energy source 40, for example in the form of a rechargeable battery.

The first unit 50 further comprises a power converter 10, for example in the form of a DC-AC converter, that is fed from the energy source 40 via a number of n lines, for example is fed via n=2 lines, and that is designed to generate a number m of signals S1 to Sm.

The first unit 50 further comprises a switching unit 11, the input side of which is supplied with the signals S1 to Sm generated by the power converter 10 and the output side of which is connected to the functional terminals 51_1 to 51_m.

The first unit 50 further comprises an insulation monitoring unit 12 that is designed to detect an undesired galvanic connection of a component of the units 20, 30 and 50 of the system 100 to the reference potential 23. Reference is also made to the relevant specialist literature for the basic mode of operation of such insulation monitoring units.

The first unit 50 further comprises a connection monitoring unit 13 that is designed to monitor whether the first potential equalization terminal 15 is electrically connected as intended to the corresponding potential equalization terminal 25 of the second unit 20 and to monitor whether the second potential equalization terminal 18 is electrically connected as intended to a corresponding potential equalization terminal 33 of the third unit 30.

The functions of the first unit 50 are controlled or coordinated by means of a central control unit 41.

The connection monitoring unit 13 is designed to supply a first test signal (PS1) to the first test signal terminal 14 and, depending on a signal resulting at the first potential equalization terminal 15, to monitor whether the first potential equalization terminal 15 is electrically connected as intended to the corresponding potential equalization terminal 25 of the second unit 20 to be connected to the first unit 50.

The connection monitoring unit 13 is further designed to supply a second test signal PS2 to the second test signal terminal 17 of the first unit 50 and, depending on a signal present at the corresponding potential equalization terminal 18 of the first unit 50 and/or a signal present at the corresponding potential equalization terminal 16 of the second unit 20, to monitor whether the potential equalization terminals 32, 33 of the third unit 30 are electrically connected as intended to the corresponding potential equalization terminal 16 of the second unit 20 or to the corresponding potential equalization terminal 18 of the first unit 50.

The switching unit 11 interrupts a connection between the power converter 10 and the signal terminals 51_1 to 51_m when the connection monitoring unit 13 detects that the potential equalization terminals 15, 16 and/or 18 are not electrically connected as intended.

Furthermore, the switching unit 11 interrupts a connection between the power converter 10 and the signal terminals 51_1 to 51_m when the insulation monitoring unit 12 detects an undesired galvanic connection of a component of the first unit 50 and/or the second unit 20 and/or the third unit 30 to the reference potential 23.

An electrical connection between the potential equalization terminals 32, 33 of the third unit 30 and corresponding terminals of the first unit 50 and/or the second unit 20 can be effected via a flexible, movable or sliding connection and/or via a temporarily fixed connection, in particular a grounding rod, screw connections or plug-in contacts.

The system 100 can have a plurality of first units 50, second units 20 and third units 30, wherein a respective first unit 50 generates its first test signal PS1 and/or its second test signal PS2 with a unique identifier.

Figure 2:
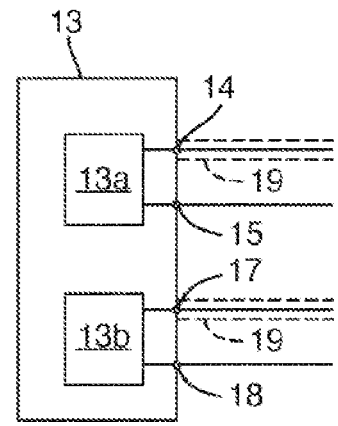
FIG. 2 is a schematic circuit diagram of a connection monitoring unit of the system shown in FIG. 1.
Figure 2:
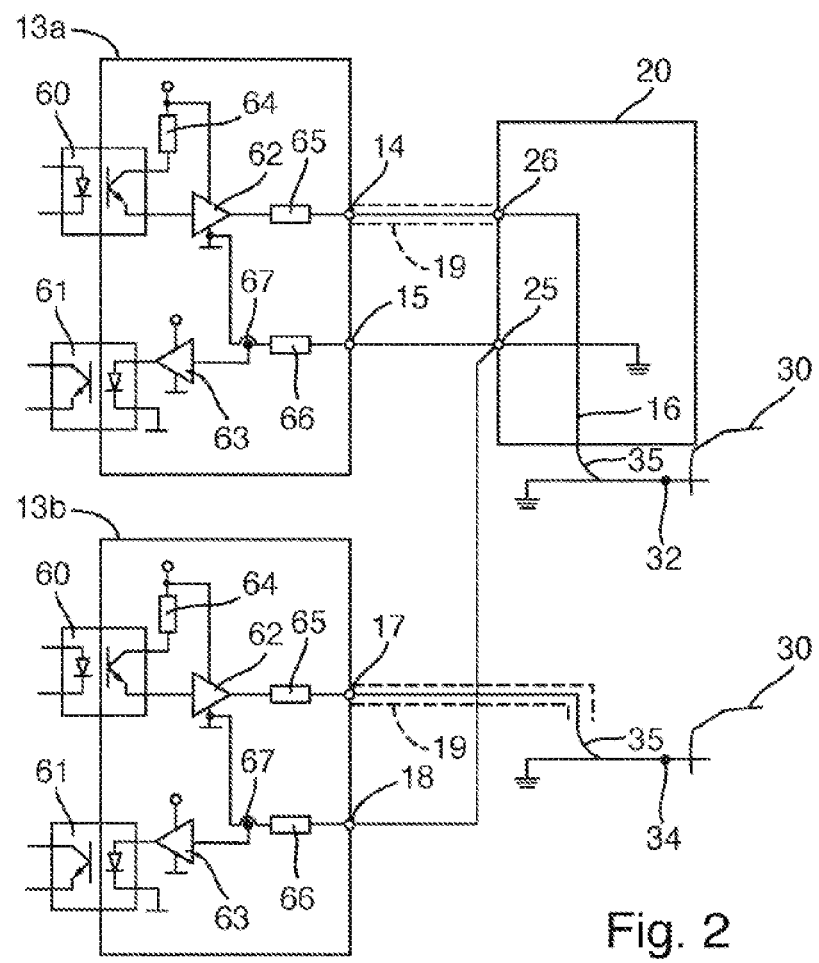

FIG. 2 shows a schematic circuit diagram of an internal design of the connection monitoring unit 13.

The connection monitoring unit 13 comprises two sub-units 13a and 13b with the same internal design. The connection monitoring unit 13 is galvanically isolated from the remaining components of the first unit 50.

A respective sub-unit 13a or 13b comprises optocouplers 60 and 61, with signals being fed into the sub-units 13a or 13b via the respective optocoupler 60 and being read out via the respective optocoupler 61.

Respective resistors 64, 65 and 66 are connected as illustrated.

A respective current sensor 67 controls a respective Schmitt trigger 63 that is used for signal conditioning and control of the respective optocoupler 61.

A connection of the test signal terminals 14 and 26 and 17 and 34 can be protected from an undesired connection to the reference potential 23 by means of a double insulation 19.

The potential output terminals 16 and 32 can be connected and the test signal terminals 17 and 34 can be connected via a sliding connection 35.

According to the invention, instead of the conventional galvanic insulation of the units 20, 30 and 50 from one another, the insulation monitoring unit 12 of the first unit 50 is expanded, which, for example, can also detect a first fault in the second unit 20 or a towed vehicle through expanded functionality.

Figure 3:
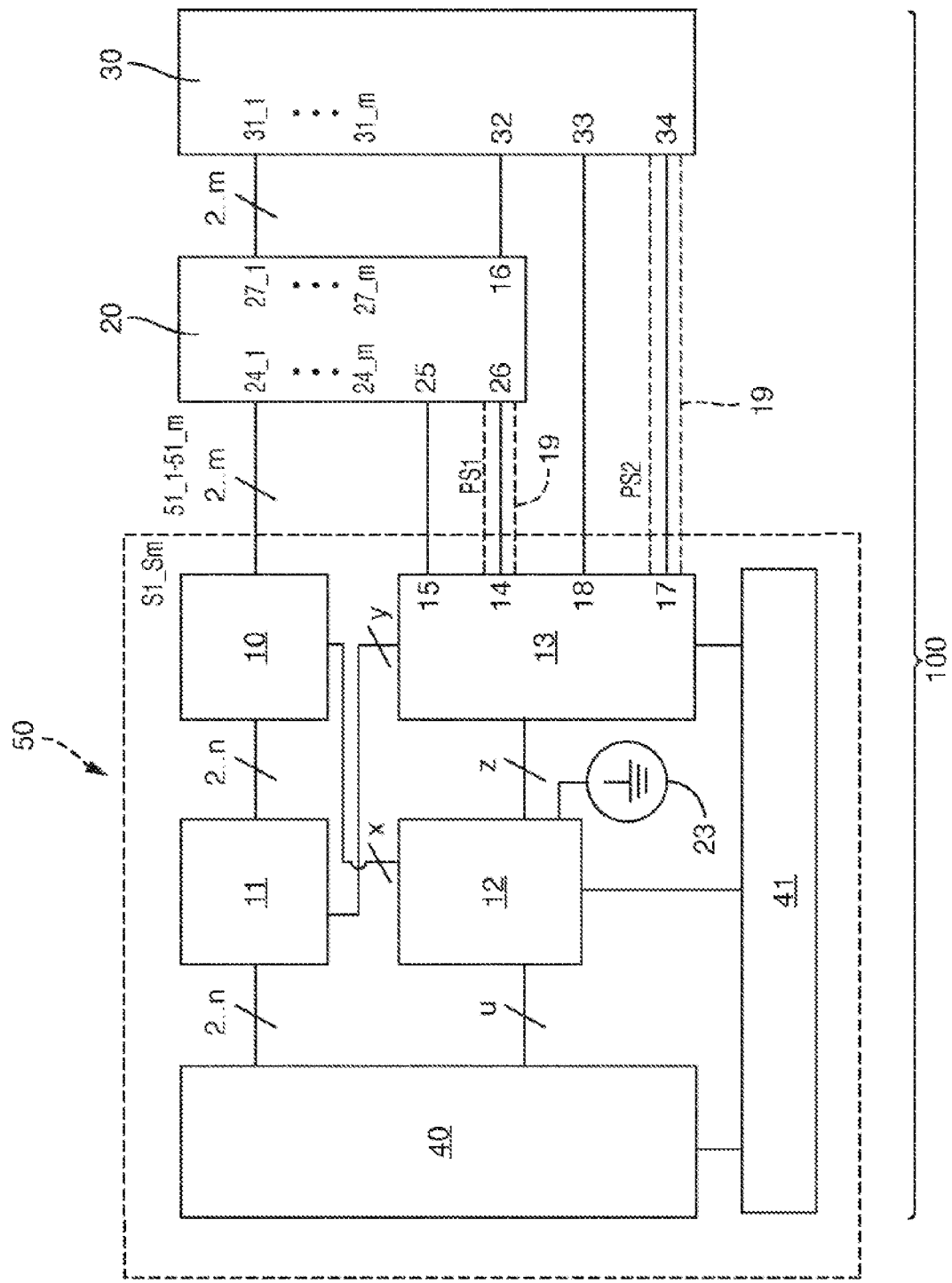
FIG. 3 is a schematic block diagram of a system for distributing electrical energy according to another embodiment.

FIG. 3 shows a schematic block diagram of a system for distributing electrical energy according to another embodiment. In contrast to the embodiment shown in FIG. 1, the input side of the switching unit 11 is connected here to the energy storage device 40 and the output side is connected to the power converter 10. In the event of a fault, the power converter 10 can thus be isolated from the energy store 40. In particular, during the precharging of a link circuit of the power converter 10, the power converter 10 can be isolated from the energy store in the event of an insulation fault.

Typical applications of the invention are briefly described below.

1. Monitoring of a Chassis Connection (potential Equalization Via the Potential Equalization Terminals)

By applying a test signal that is galvanically isolated from the overall system, for example a test voltage (low voltage, PWM signal), to the second unit or a towed vehicle (consumer), a current flow can be measured via one or two measuring inputs, which creates an intended electrical connection of the potential equalization terminals, that is to say the existence of a vehicle chassis connection (reference potential or equalization potential), can be reliably determined.

The presence of a sufficient chassis connection can be checked by comparing the measured current with a suitable limit value. If the chassis connection between the towing vehicle and the towed vehicle is interrupted, a current flow can no longer be measured.

2. Insulation Monitoring Unit in the First Unit or in the Towing Vehicle

In a galvanically connected supply system between the first unit or towing vehicle and the second unit or trailer, the insulation monitoring unit detects an initial insulation fault both in the towing vehicle itself and in the trailer, as long as there is a sufficiently low-impedance chassis connection between the towing vehicle and trailer.

3. Switching Off the Energy Supply of the Second Unit or the Towed Vehicle

By immediately switching off the energy supply using the switching unit, a possible insulation fault in the second unit or in the trailer is isolated from the supply system in the first unit or in the towing vehicle, that is to say the detected insulation fault is separated from the towing vehicle. This is an important prerequisite for ensuring that the driving characteristics of the entire vehicle are not impaired.

It is up to the vehicle manufacturer to decide whether the energy supply for the second unit or the towed vehicle is isolated immediately or only after a certain period of time or when another event occurs. It may be that the connection is only disconnected when the vehicle is stopped or parked if it can be assumed that no people can be on the towed vehicle while driving.

4. Reliable Detection of an Initial Error

The above measures can be used to ensure that an initial fault is detected before there is a hazard from electric current in the event of a second fault (touching live parts that are not covered).

5. Switching on Again after an Insulation Fault has been Detected

Since the initial fault can usually be assumed to be harmless, it is possible to switch on again at full voltage. If desired by the vehicle manufacturer, it is possible to switch on again at a lower voltage, for example at a safe 50 V, and this voltage can be used to check whether the insulation fault is still present.

6. Expansion to Electrical Safety in the Vehicle Environment

As an expansion, a second test signal terminal or measurement input on the expanded insulation monitoring unit can be used to monitor a potential connection between the second unit or trailer and the road (ground). The current impressed into the trailer chassis can be routed back to the insulation monitoring unit via a movable ground connection, where it can be measured and checked for a suitable limit value.

The first unit, the second unit and/or the third unit may have a movable ground connection (wiper).

7. Monitoring of a Sufficient Potential Connection to the Ground (Road)

If the second control current is interrupted, it must be assumed that the insulation monitoring unit cannot identify a possible initial fault in the area surrounding the vehicle because the potential shift generated as a result cannot be measured.

In the case of a construction site vehicle, this information can be used, for example, to ensure that the power supply for the second unit or the trailer is either not switched on or is switched off when the measuring current is disconnected. In this case, too, the measured loop current is compared with a suitable limit value.

It is up to the vehicle manufacturer to interrupt the energy supply immediately if the second test signal terminal or measurement input detects a control current that is too low or to make the shutdown dependent on other conditions. It may be that the energy supply (electrical connection) is only disconnected when the vehicle is stopped or parked if it can be assumed that work around the vehicle is only possible when it is stationary.

8. Additional Advantages

As described above, the combination of insulation monitoring unit, power converter or DC-AC conversion and shutdown by means of a switching unit makes it possible to immediately and reliably detect an initial insulation fault and to switch off the energy supply or supply voltage of the corresponding network. However, there are other advantages, especially cost and application advantages:

9. Current-Free Switching of the Switching Elements

The integration of the insulation monitoring unit and the power converter in the first unit makes it possible, in the event of a detected insulation fault, to first switch off the power converter and shortly thereafter the switch of the switching unit as soon as the current has dropped to zero. This is absolutely necessary, especially with a DC voltage supply, in order to avoid arcs. By ensuring the correct sequence, it can be guaranteed that the switches are always switched with no (direct) current, both in the event of an insulation fault and in the event of a short circuit, that is to say overcurrent. As a result, significantly more cost-effective switching elements can be used in the switching unit, thereby saving costs and installation volume.

10. AC Switching of the Switching Elements

With AC power supplies, due to the periodic zero crossings of the currents, shutdown is also possible during operation (current not equal to zero).

According to the invention, a significant cost saving can be achieved by preventing galvanic isolation between the first unit, the second unit and the third unit, which causes significant additional costs for power semiconductors and transformers.

The invention claimed is:

1. A system, comprising:
   a first unit, comprising:
      a number m of functional terminals,
      a first potential equalization terminal that is to be galvanically connected to a reference potential,
      an energy source,
      a power converter that is fed from the energy source and that is configured to generate a number m of signals,
      a switching unit, and
      a first test signal terminal,
   wherein an input side of the switching unit is supplied with the signals generated by the power converter and an output side is connected to the functional terminals or wherein the input side of the switching unit is connected to the energy source and the output side is connected to the power converter,
      an insulation monitoring unit that is configured to detect an undesired galvanic connection of a component of the system to the reference potential,
      a connection monitoring unit that is configured to monitor whether the first potential equalization terminal is electrically connected as intended to a corresponding potential equalization terminal of a second unit to be connected to the first unit,
   wherein the connection monitoring unit is configured to supply a first test signal to the first test signal terminal and, depending on a signal present at the first potential equalization terminal, to monitor whether the first potential equalization terminal is electrically connected as intended to the corresponding potential equalization terminal of the second unit to be connected to the first unit.

2. The system as claimed in claim 1, further comprising:
   the second unit coupled to the first unit for energy exchange, the second unit comprising:
      the corresponding potential equalization terminal that is connected to the first potential equalization terminal of the first unit, and
      the test signal terminal that is connected to the first test signal terminal of the first unit, wherein the corresponding potential equalization terminal of the second unit is electrically connected to the test signal terminal of the second unit.

3. The system as claimed in claim 2, wherein the second unit comprises:
   a number m of functional terminals that are connected to the number m of functional terminals of the first unit.

4. The system as claimed in claim 1, wherein
   the switching unit interrupts a connection between the power converter and the signal terminals when the connection monitoring unit detects that the first potential equalization terminal of the first unit is not electrically connected as intended to the corresponding potential equalization terminal of the second unit, or
   the switching unit interrupts a connection between the energy source and the power converter when the connection monitoring unit detects that the first potential equalization terminal of the first unit is not electrically connected as intended to the corresponding potential equalization terminal of the second unit.

5. The system as claimed in claim 2, further comprising:
   a third unit coupled to the first unit or the second unit for energy exchange, the third unit comprising:
      at least one potential equalization terminal that is connected to a further potential equalization terminal of the first unit or that is connected to a further potential equalization terminal of the second unit,
   wherein the connection monitoring unit is configured to monitor whether the at least one potential equalization terminal of the third unit is electrically connected as intended to the corresponding potential equalization terminal of the first unit or the second unit.

6. The system as claimed in claim 5, wherein
   the connection monitoring unit is configured to supply a second test signal to a second test signal terminal of the first unit and, depending on a signal present at a corresponding potential equalization terminal of the first unit and/or a signal present at a corresponding potential equalization terminal of the second unit, to monitor whether the at least one potential equalization terminal of the third unit is electrically connected as intended to the corresponding potential equalization terminal of the first unit or to the corresponding potential equalization terminal of the second unit.

7. The system as claimed in claim 5, wherein
the insulation monitoring unit is configured to detect an undesired galvanic connection of a component of one or more of the first unit, the second unit, or the third unit, to the reference potential.

8. The system as claimed in claim 6, wherein
the system has a plurality of first units, wherein a respective first unit generates the first test signal and/or the second test signal with a unique identifier.

9. The system as claimed in claim 7, wherein
the switching unit interrupts a connection between the power converter and the signal terminals when the insulation monitoring unit detects the undesired galvanic connection of a component of one or more of the first unit, the second unit, or the third unit, to the reference potential, or
the switching unit interrupts a connection between the energy source and the power converter when the insulation monitoring unit detects the undesired galvanic connection of a component of one or more the first unit, the second unit, or the third unit, to the reference potential.

10. The system as claimed in claim 5, wherein
an electrical connection between the potential equalization terminals of the third unit and corresponding terminals of the first unit and/or the second unit is carried out via a flexible, movable or sliding connection and/or via a temporarily fixed connection.

11. The system as claimed in claim 10, wherein
the connection is a grounding rod, screw connections or plug-in contacts.

12. The system as claimed in claim 5, wherein the first and second units are mobile units.

13. The system as claimed in claim 12, wherein the third unit is a stationary unit.

* * * * *